March 6, 1928.
W. A. COOK
1,661,467
REVERSIBLE CLUTCH
Filed Feb. 7, 1927
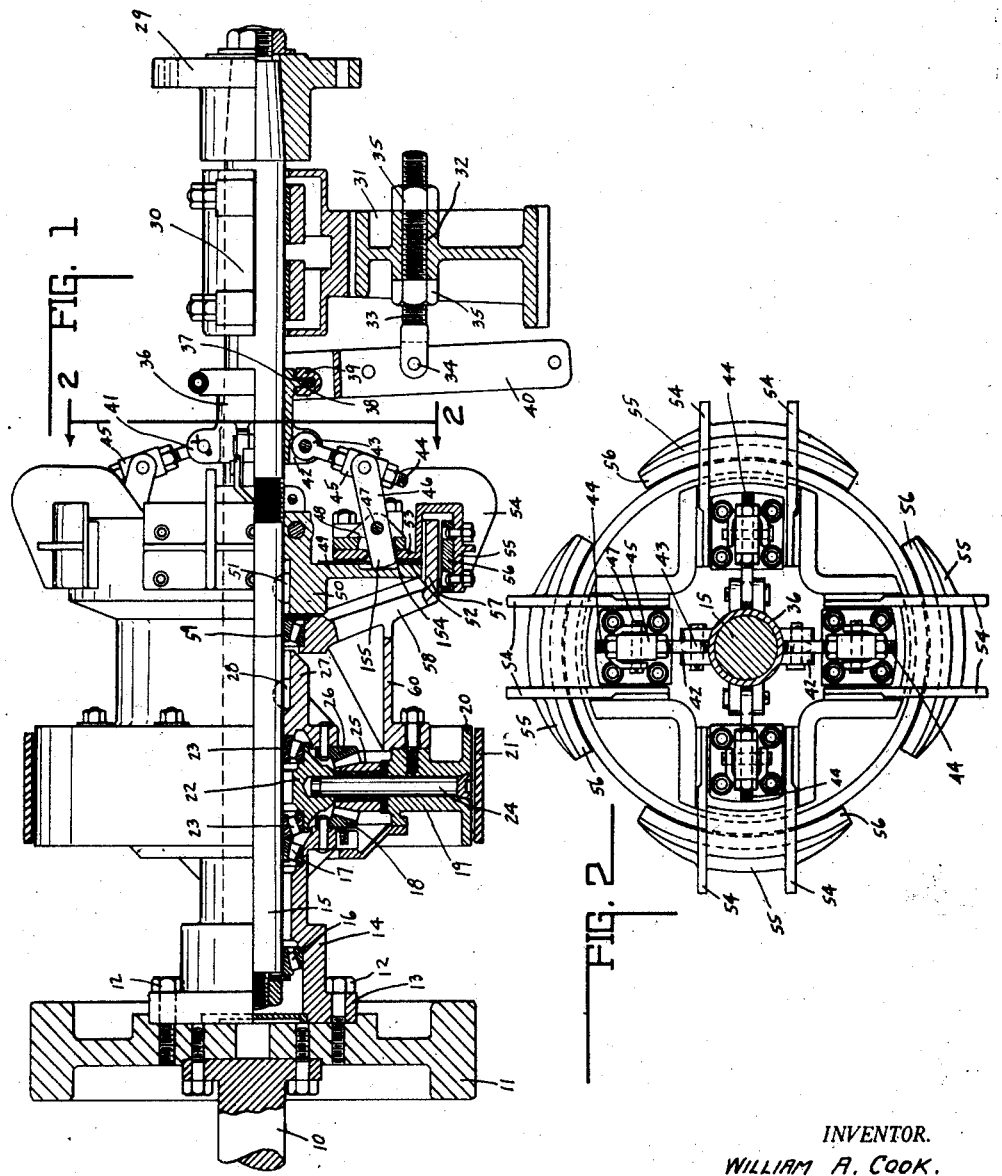
INVENTOR.
WILLIAM A. COOK.
BY
ATTORNEYS.

Patented Mar. 6, 1928.

1,661,467

UNITED STATES PATENT OFFICE.

WILLIAM A. COOK, OF MARION, INDIANA, ASSIGNOR TO MARION MACHINE, FOUNDRY & SUPPLY CO., OF MARION, INDIANA, A CORPORATION.

REVERSIBLE CLUTCH.

Application filed February 7, 1927. Serial No. 166,433.

This invention relates to a reversible drive.

The chief object of this invention consists in associating with a pair of frictionally engageable members suitable means for selectively gripping the same for cooperation with other parts to secure reverse driving of a driven member.

The chief feature of the invention consists in the particular arrangement of the several parts comprising the reversing mechanism, and particularly that arrangement whereby a reversible shaft extends through the driving hub and constitutes a bearing therefor.

The full nature of the invention will be understood from the accompanying drawings and the following description and claim:

In the drawings Fig. 1 is a partial elevation and partial longitudinal section of the reversing mechanism. Fig. 2 is an end view taken on line 2—2 of Fig. 1 and in the direction of the arrows of one of the friction clutch constructions and that used for direct driving.

This invention is of the general character which includes a uni-directional power and a reversible and direct driven member, associated with which is a pair of selectively operable friction members and a gear and pinion drive.

The invention consists in the particular arrangement of the several parts, one feature thereof being directed specifically to the driven member constituting a shaft which extends the full length of the reversing mechanism and which is reversibly driven by means of a tubular hub mounted on one end of said shaft.

In the drawings, 10 indicates a power shaft carrying a fly-wheel 11 to which is coupled by bolts 12, a flange 13 of the driving hub 14. Driving hub 14 is tubular and extending into the same and substantially through it, is a driven shaft 15, the latter forming a support for the former. The anti-friction construction 16 or a roller race, and another roller race 17 are provided adjacent the opposite ends of both and serve to align the hub coaxially with the shaft. The end of the hub opposite flywheel 11 supports a ring gear 18 having bevel teeth.

Also rotatably mounted on the shaft 15 is a spidered pinion supporting, brake drum 19 having the brake band engageable surface 20 engageable by the brake band 21 and an inner hub member 22 rotatably mounted through the roller race ways 23 upon shaft 15. Pivot pins 24 are radially mounted in the hub 22 and the flange 19 of the spidered brake drum, and rotatably mounted on each of said spindles 24 is a bevel pinion 25 and all of said pinions constantly mesh with the gear 18. Also constantly in mesh is a ring gear 26 having bevel teeth, the latter being secured to a hub 27 keyed to or otherwise rigid with the shaft 15 as at 28.

When the brake band 21 engages the drum 20 the flange 19 is held stationary. Rotation of shaft 10 through the hub 14 and bevel ring gear 18 rotates the pinions 25 which in turn rotate the bevel ring gear 26, and since it is keyed to the shaft 15, said shaft 15 is reversely rotated, and since the two ring gears are alike, the rotation is at the same rate but in opposite directions. Mounted upon the end of the shaft 15 is a coupling construction 29 for connection to a similar coupling construction of a driven member. The foregoing constitutes the reverse driving arrangement.

The shaft 15 is herein shown provided with at least one bearing and the same is indicated at 30 in the standard 31. Said standard 31 has an opening 32 extending parallel to the shaft axis and a threaded yoke bolt 33 supporting a pivot pin 34 is adjustably mounted therein by means of the nuts 35. A collar 36 encircles the shaft 15 and said collar includes a peripheral extension 37 that rides in a groove 38 formed in a ring 39 carried by the lever 40 pivotally mounted at 34. The opposite end of the hub or sleeve 36 is provided with a plurality of ears 41, each slotted at 42 to receive the eye 43 of a bolt 44 which adjustably supports a pivotal block 45 in turn pivotally supporting a pair of links 46, that in turn are pivotally supported at 47 in ears 48 formed on a plate 49 which has a hub 50 keyed at 51 or otherwise suitably secured to the shaft 15. Each of the ear constructions 48 is in spaced relation to the plate 49 and forms a slot 52 therebetween, in which is mounted a tongue 53 of a U-shaped shoe 54, one face thereof being arcuate as at 55 and being faced with suitable friction material 56. The tongue 53 includes a slot 154 and the end 155 of the link 46 extends into said slot and thus when the link 46 is tilted, the shoe is caused to move radially, inwardly or outwardly into and out of drum engagement, the drum herein being shown as a peripheral cylindrical flange 57 carried by the spidered arms 58 rotatably supported by anti-friction element 59 and rigidly connected by the arms 60 to the flange 19 of the brake drum.

When the hub 36 is shifted longitudinally of the shaft by lever 40, the toggle linkages are actuated to draw the several shoes, and herein four are illustrated, into drum engagement or into the release position as shown in Fig. 1. When retracted into drum engagement, since the hub 50 is keyed to shaft 15 the drum 57 must rotate with the shaft 15. Since the hub 27 supporting ring gear 26 is also keyed to shaft 15, and since the bevel gear 26 meshes with the bevel pinion 25, the aforesaid construction is such that the several bevel gears are locked together, and therefore, cannot rotate relatively. Since they are thus locked together, the gear 18 cannot rotate relatively of the pinion 25 or the gear 26, and therefore, the pinion 25 is locked to the driving gear 18. Thus shaft 15 is driven in the same direction and at the same speed as the hub 14 when the brake band 21 is released from the brake drum and the shoes engage the drum 57. A suitable common selective brake and clutch control may be provided, if desired.

The invention claimed is:

In a clutch construction, a shaft, a driving pinion support rotatably mounted thereon, a pair of opposed anti-friction thrust bearings interposed therebetween, a driving hub enclosing one end of the shaft, and another pair of opposed anti-friction thrust bearings interposed therebetween, adjacent bearings of both pairs of opposed anti-friction thrust bearings opposing each other.

In witness whereof, I have hereunto affixed my signature.

WILLIAM A. COOK.